(12) United States Patent
Koseoglu

(10) Patent No.: US 8,721,927 B2
(45) Date of Patent: May 13, 2014

(54) PRODUCTION OF SYNTHESIS GAS FROM SOLVENT DEASPHALTING PROCESS BOTTOMS IN A MEMBRANE WALL GASIFICATION REACTOR

(75) Inventor: Omer Refa Koseoglu, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 13/487,847

(22) Filed: Jun. 4, 2012

(65) Prior Publication Data

US 2013/0026418 A1 Jan. 31, 2013

Related U.S. Application Data

(60) Provisional application No. 61/512,243, filed on Jul. 27, 2011.

(51) Int. Cl.
*C01B 3/02* (2006.01)
(52) U.S. Cl.
USPC .......................................... 252/373
(58) Field of Classification Search
None
See application file for complete search history.

(56) References Cited

U.S. PATENT DOCUMENTS

| | | | |
|---|---|---|---|
| 3,968,023 A | 7/1976 | Yan | |
| 4,017,383 A | 4/1977 | Beavon | |
| 4,125,458 A | 11/1978 | Bushnell | |
| 4,391,701 A | 7/1983 | Le Page | |
| 4,572,781 A * | 2/1986 | Krasuk et al. | 208/309 |
| 4,959,080 A | 9/1990 | Sternling | |
| 5,435,940 A | 7/1995 | Doerling | |
| 5,958,365 A * | 9/1999 | Liu | 423/655 |
| 6,241,874 B1 | 6/2001 | Wallace | |
| 6,702,936 B2 | 3/2004 | Rettger | |
| 6,773,630 B2 | 8/2004 | Stellaccio | |
| 7,347,051 B2 | 3/2008 | Christensen | |
| 7,566,394 B2 | 7/2009 | Koseoglu | |
| 7,805,923 B2 * | 10/2010 | Yoshida | 60/39.464 |
| 2006/0029539 A1* | 2/2006 | Dutta et al. | 423/651 |
| 2006/0272982 A1 | 12/2006 | Montanari | |
| 2007/0051043 A1 | 3/2007 | Schingnitz | |
| 2007/0062117 A1 | 3/2007 | Schingnitz | |
| 2007/0079554 A1 | 4/2007 | Schingnitz | |
| 2007/0225382 A1 | 9/2007 | Van Den Berg | |

(Continued)

FOREIGN PATENT DOCUMENTS

| | | |
|---|---|---|
| JP | 58-036903 A | 3/1983 |
| JP | 04-353225 A | 12/1992 |
| WO | WO 2009/065559 A1 * | 5/2009 |

OTHER PUBLICATIONS

Moreno-Arciniegas et al., "Syngas Obtainment from the Gasification of Asphaltenes of the San Fernando Crude Oil", LSCT&F-Ciencia Tecnologia y Futuro, Dec. 2009, vol. 3, No. 5, pp. 189-203.

*Primary Examiner* — Melvin C Mayes
*Assistant Examiner* — Douglas Call
(74) *Attorney, Agent, or Firm* — Abelman, Frayne & Schwab

(57) ABSTRACT

A cost-effective solution for the disposal of solvent deasphalting process bottoms that include spent solid adsorbent material containing ash-producing constituents, asphalt and process reject materials is provided by introducing them in the form of a flowable slurry into a membrane wall gasification reactor to produce a synthesis gas and, optionally, subjecting the synthesis gas to a water-gas shift reaction to produce a more hydrogen-rich product stream; process steam and electricity are produced by recovering the sensible heat values from the hot synthesis gas.

25 Claims, 1 Drawing Sheet

(56) References Cited

U.S. PATENT DOCUMENTS

| | | |
|---|---|---|
| 2008/0000404 A1 | 1/2008 | Fischer |
| 2008/0256860 A1 | 10/2008 | Von Kossak-Glowczewski |
| 2008/0262111 A1* | 10/2008 | Ploeg et al. .................. 518/704 |
| 2009/0029299 A1 | 1/2009 | Fischer |
| 2009/0169443 A1* | 7/2009 | Wang et al. .................. 422/187 |
| 2009/0263316 A1* | 10/2009 | Iyer et al. .................. 423/658.3 |
| 2009/0301931 A1* | 12/2009 | Koseoglu et al. .............. 208/22 |
| 2010/0163804 A1* | 7/2010 | Schenck .................. 252/373 |

* cited by examiner

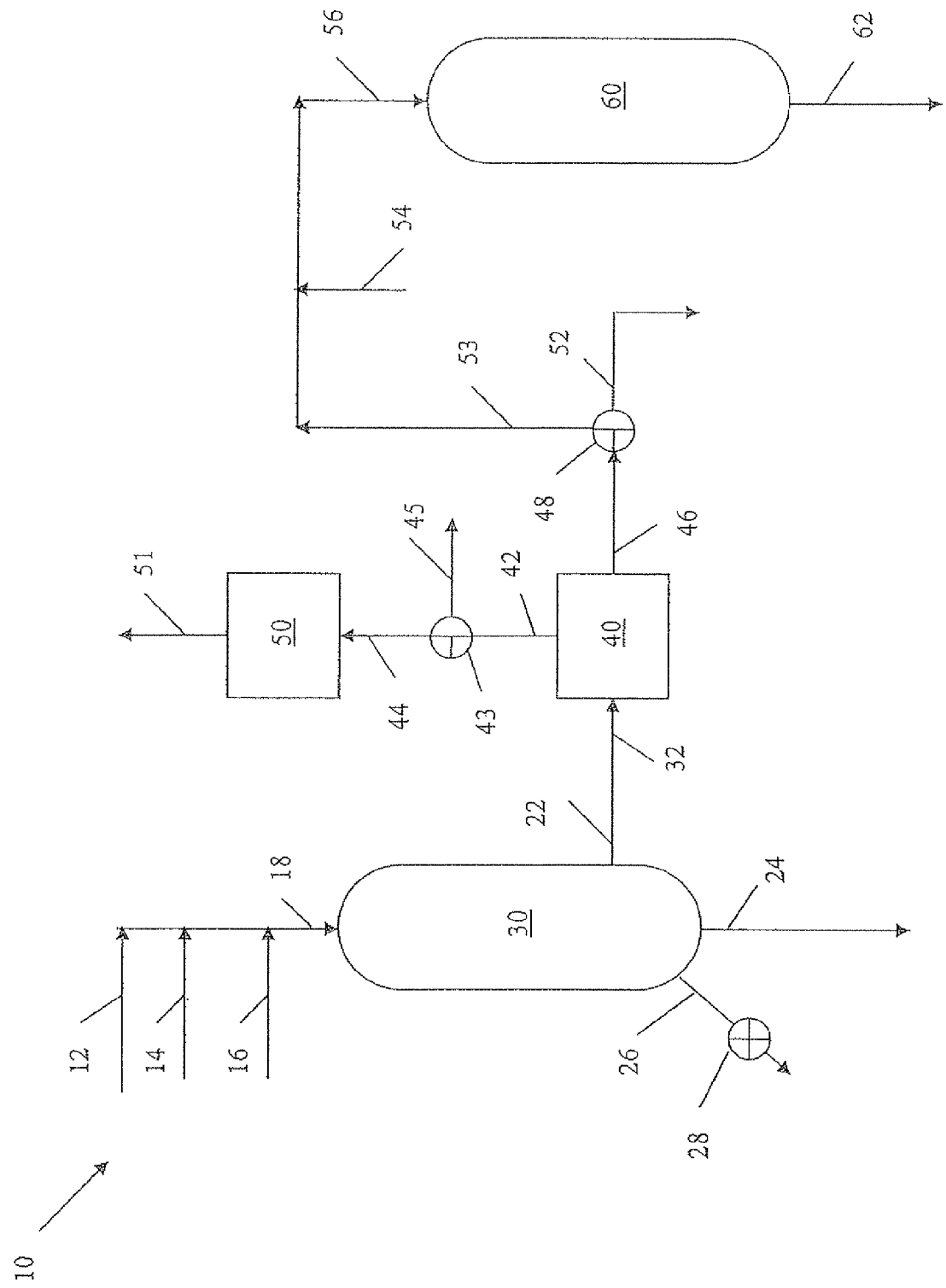

PRODUCTION OF SYNTHESIS GAS FROM SOLVENT DEASPHALTING PROCESS BOTTOMS IN A MEMBRANE WALL GASIFICATION REACTOR

RELATED APPLICATIONS

This application claims the benefit of U.S. Provisional Patent Application No. 61/512,243 filed Jul. 27, 2011, the disclosure of which is hereby incorporated by reference.

BACKGROUND OF THE INVENTION

1. Field of the Invention

The present invention relates to processes for the partial oxidation in a membrane wall gasification reactor of heavy bottoms that can also contain waste materials recovered from a solvent deasphalting unit operation to produce a high value synthesis gas.

2. Description of Related Art

Solvent deasphalting is a process employed in oil refineries to extract valuable components from residual oil. The extracted components can be further processed in refineries where they are cracked and converted into lighter fractions, such as gasoline and diesel. Suitable residual oil feedstocks which can be used in solvent deasphalting processes include, for example, atmospheric distillation bottoms, vacuum bottoms, crude oil, topped crude oils, coal oil extract, shale oils, and oils recovered from tar sands. Solvent deasphalting processes are well known and described, for instance, in U.S. Pat. Nos. 3,968,023, 4,017,383, and 4,125,458, the disclosures of which are incorporated herein by reference.

In a typical solvent deasphalting process, a light hydrocarbon solvent, which can be a combination of one or more paraffinic compounds, is admixed with a residual oil feed to flocculate and separate the solids from the oil mixture. Common solvents and their mixtures used in the deasphalting process include normal and/or iso-paraffins with carbon numbers ranging from 1 to 7, preferably from 3 to 7, including most preferably, propanes, normal and/or iso butanes, hexanes, and heptanes. Under elevated temperatures and pressures, generally below the critical temperature of the solvent, in an asphaltene separator, the mixture is separated into two liquid streams, including (1) a substantially asphaltenes-free stream of deasphalted oil that includes resins, and (2) a mixture of asphaltenes and solvent that includes some dissolved deasphalted oil.

The substantially asphaltenes-free mixture of deasphalted oil and solvent is normally passed to a solvent recovery system. The solvent recovery system of a solvent deasphalting unit extracts a fraction of the solvent from the solvent-rich deasphalted oil by boiling off the solvent, commonly using steam or hot oil from heaters. The solvent is recycled and sent back for use in the solvent deasphalting unit.

In some processes, the deasphalted oil fraction is also separated into a resins fraction and a resins-free fraction. "Resins" as used herein means materials that have been separated and obtained from a solvent deasphalting unit. Resins are denser and heavier than deasphalted oil, e.g., maltenes, but lighter than asphaltenes. The resins product usually comprises aromatic hydrocarbons with highly aliphatic-substituted side chains, and can also include metals, such as nickel and vanadium.

An enhanced solvent deasphalting process is disclosed in U.S. Pat. No. 7,566,394 in which a hydrocarbon oil feedstock containing asphaltenes is introduced into a mixing vessel with a paraffinic solvent and a solid adsorbent material. The solid adsorbent material can include attapulgus clay, alumina, silica activated carbon and zeolite catalyst materials, and combinations of those materials. The solid asphaltenes formed in the paraffinic solvent phase are mixed with the adsorbent material for a time sufficient to adsorb sulfur- and nitrogen-containing heavy polynuclear aromatic molecules present in the hydrocarbon oil feed on the adsorbent material. The solid phase comprising asphaltenes and adsorbent is separated from the oil/solvent mixture. The oil/solvent mixture is passed to a separation vessel to be separated into deasphalted oil and paraffinic solvent. The paraffinic solvent is recovered and recycled to the mixing vessel.

The asphalt/adsorbent material mixture is passed to a filtration vessel with an aromatic or polar solvent. The solvent can comprise benzene, toluene, xylenes, or tetrahydrofuran. The adsorbent materials are separated and cleaned in the filtration vessel. The cleaned solid adsorbent is recovered and recycled to the mixing vessel. The asphalt material is extracted from solid adsorbent materials and can be used directly as an asphalt component, or blended in an asphalt pool. The aromatic or polar solvent mixture is then passed to a fractionator to recover the solvent for recycling to the filtration vessel. Process reject materials including heavy polynuclear hydrocarbons with a high concentration of nitrogen and sulfur compounds are discharged from the fractionator.

During the solvent deasphalting process described above, the adsorbent material(s) must be reconditioned and/or removed after their adsorbent capacity falls below a desired efficacy, i.e., they are deemed to be spent. The spent adsorbent includes constituents such as heavy polynuclear aromatic molecules, sulfur, nitrogen and/or metals. Disposal of the spent adsorbent as waste materials incurs substantial expense and entails environmental considerations.

In addition, when adsorbent materials are reconditioned, for example, by solvent desorption, heat desorption or pyrolysis at high temperatures, the process reject materials removed from the adsorbent materials must also be disposed of appropriately. These process reject materials can include heavy hydrocarbon molecules containing sulfur, nitrogen and/or heavy aromatic molecules, and metals such as nickel and vanadium.

A process is described in U.S. Patent Publication Number 2009/0301931 for the disposal of refinery process waste including spent catalytic and non-catalytic adsorbent materials and process reject materials remaining after their desorption from solid adsorbent material(s). As an example, solvent deasphalting bottoms recovered from a solvent deasphalting process such as that described in U.S. Pat. No. 7,566,394 are collected in an asphalt pool and used as paving materials or cutback asphalt. In particular, spent solid adsorbent material and asphalt are discharged from the filtration vessel to an asphalt pool. Process reject materials, which include bituminous materials, are discharged from the fractionator to the asphalt pool. A portion of the asphalt and adsorbent material mixture can also be discharged directly into the asphalt pool, for example, if the adsorbent materials are not to be recycled back to the mixing vessel of the enhanced solvent deasphalting unit. The disposal method described in U.S. Patent Publication Number 2009/0301931 is one option to dispose of the process reject material from solvent deasphalting; however, it may not be cost-effective due to the existing refinery infrastructure or the feedstock and/or product cost margins. Therefore, a need exists for an alternative and cost-effective solution for disposal of solvent deasphalting process bottoms while minimizing conventional waste handling demands.

Gasification is well known in the art and it is practiced worldwide with application to solid and heavy liquid fossil fuels, including refinery bottoms. The gasification process uses partial oxidation to convert carbonaceous materials, such as coal, petroleum, biofuel, or biomass with oxygen at high temperature, i.e., greater than 800° C., into synthesis gas, steam and electricity. The synthesis gas consisting of carbon monoxide and hydrogen can be burned directly in internal combustion engines, or used in the manufacture of various chemicals, such as methanol via known synthesis processes and synthetic fuels via the Fischer-Tropsch process.

The major benefits for a refinery using a heavy residue gasification process are that it can also provide a source of hydrogen for hydroprocessing to meet the demand for light products; it produces electricity and steam for refinery use or for export and sale; it can take advantage of efficient power generation technology as compared to conventional technologies that combust the heavy residue; and it produces lower pollutant emissions as compared to conventional technologies that combust heavy residues as a means of their disposal. Furthermore, the gasification process provides a local solution for the heavy residues where they are produced, thus avoiding transportation off-site or storage; it also provides the potential for disposal of other refinery waste streams, including hazardous materials; and a potential carbon management tool, i.e., a carbon dioxide capture option is provided if required by the local regulatory system.

Three principal types of gasifier technologies are moving bed, fluidized bed and entrained-flow systems. Each of the three types can be used with solid fuels, but only the entrained-flow reactor has been demonstrated to process liquid fuels. In an entrained-flow reactor, the fuel, oxygen and steam are injected at the top of the gasifier through a co-annular burner. The gasification usually takes place in a refractory-lined vessel which operates at a pressure of about 40 bars to 60 bars and a temperature in the range of from 1300° C. to 1700° C.

There are two types of gasifier wall construction: refractory and membrane. The gasifier conventionally uses refractory liners to protect the reactor vessel from corrosive slag, thermal cycling, and elevated temperatures that range from 1400° C. up to 1700° C. The refractory material is subjected to the penetration of corrosive components from the generation of the synthesis gas and slag and thus subsequent reactions in which the reactants undergo significant volume changes that result in degradation of the strength of the refractory materials. The replacement of refractory linings can cost several millions of dollars a year and several weeks of downtime for a given reactor. Up until now, the solution has been the installation of a second or parallel gasifier to provide the necessary continuous operating capability, but the undesirable consequence of this duplication is a significant increase in the capital costs associated with the unit operation.

On the other hand, membrane wall gasifier technology uses a cooling screen protected by a layer of refractory material to provide a surface on which the molten slag solidifies and flows downwardly to the quench zone at the bottom of the reactor. The advantages of the membrane wall reactor include reduced reactor dimensions as compared to other systems; improved on-stream time of 90%, as compared to on-stream time of 50% for a refractory wall reactor; elimination of the need to have a parallel reactor to maintain continuous operation as in the case of refractory wall reactors; and the build-up of a layer of solid and liquid slag that provides self-protection to the water-cooled wall sections.

In a membrane wall gasifier, the build-up of a layer of solidified mineral ash slag on the wall acts as an additional protective surface and insulator to minimize or reduce refractory degradation and heat losses through the wall. Thus the water-cooled reactor design avoids what is termed "hot wall" gasifier operation, which requires the construction of thick multiple-layers of expensive refractories which will remain subject to degradation. In the membrane wall reactor, the slag layer is renewed continuously with the deposit of solids on the relatively cool surface. Further advantages include short start-up/shut down times; lower maintenance costs than the refractory type reactor; and the capability of gasifying feedstocks with high ash content, thereby providing greater flexibility in treating a wider range of coals, petcoke, coal/petcoke blends, biomass co-feed, and liquid feedstocks.

There are two principal types of membrane wall reactor designs that are adapted to process solid feedstocks. One such reactor uses vertical tubes in an up-flow process equipped with several burners for solid fuels, e.g., petcoke. A second solid feedstock reactor uses spiral tubes and down-flow processing for all fuels. For solid fuels, a single burner having a thermal output of about 500 MWt has been developed for commercial use.

In both of these reactors, the flow of pressurized cooling water in the tubes is controlled to cool the refractory and ensure the downward flow of the molten slag. Both systems have demonstrated high utility with solid fuels, but not with liquid fuels.

For production of liquid fuels and petrochemicals, the key parameter is the ratio of hydrogen-to-carbon monoxide in the dry synthesis gas. This ratio is usually between 0.85:1 and 1.2:1, depending upon the feedstock characteristics. Thus, additional treatment of the synthesis gas is needed to increase this ratio up to 2:1 for Fischer-Tropsch applications or to convert carbon monoxide to hydrogen through the water-gas shift reaction represented by $CO+H_2O \rightarrow CO_2+H_2$. In some cases, part of the synthesis gas is burned together with some off gases in a combined cycle to produce electricity and steam. The overall efficiency of this process is between 44% and 48%.

While gasification processes are well developed and suitable for their intended purposes, their applications in conjunction with other refinery operations have been limited.

It is therefore an object of this invention to provide an integrated process for the disposal of solvent deasphalting bottoms recovered from a solvent deasphalting process that is economically valuable and environmentally friendly, and that is capable of producing a synthesis gas and/or hydrogen that can be used as a feedstream for other processes in the same refinery, and to generate electricity.

SUMMARY OF THE INVENTION

The present invention comprehends the processing of solvent deasphalting bottoms recovered from a solvent deasphalting process which bottoms include spent solid adsorbent material, asphalt and process reject materials, to produce synthesis gas by partial oxidation in a membrane wall gasification reactor, and, optionally, subjecting the synthesis gas to a water-gas shift reaction to increase the total hydrogen produced.

In accordance with an embodiment, the process for the gasification of the solvent deasphalting process bottoms consisting of a spent solid adsorbent material, asphalt and process reject materials is integrated with the generation of electricity and includes the steps of:
   a. preparing a flowable slurry of the solvent deasphalting process bottoms;
   b. introducing the slurry of solvent deasphalting process bottoms as a pressurized feedstock into a membrane wall gasification reactor with a predetermined amount of oxygen and steam that is based on the carbon content of the feedstock;

c. operating the gasification reactor at a temperature in the range of 900° C. to 1700° C. and a pressure of from 20 bars to 100 bars;

d. subjecting the solvent deasphalting process bottoms to partial oxidation to produce hydrogen, carbon monoxide and a slag material;

e. recovering the hydrogen and carbon monoxide from the reactor in the form of a hot raw synthesis gas;

f. passing the hot raw synthesis gas to a steam generating heat exchanger to cool the hot raw synthesis gas and produce steam;

g. recovering steam from the heat exchanger and introducing the steam into a turbine to produce electricity; and h. recovering the cooled synthesis gas.

In a further embodiment, the synthesis gas is subjected to the water-gas shift reaction to increase the hydrogen content of the gas produced.

As used herein, the term "spent solid adsorbent material" means used adsorbent material that has been determined to no longer have efficacy as adsorbent material for its intended application, and can include non-catalytic adsorbent materials and adsorbent materials that were originally used as catalytic materials, for instance, in hydrotreating, hydrocracking, and fluid catalytic cracking refinery processes.

As used herein, the term "asphalt" means a highly viscous liquid or semi-solid bitumen mixture that can be derived from natural deposits or petroleum refinery operations.

Additionally, as used herein, the term "process reject materials" means materials discharged from petroleum refinery operations as undesirable constituents including heavy hydrocarbon molecules containing sulfur, nitrogen and/or heavy aromatic molecules, heavy polynuclear aromatic molecules, and metals such as nickel and vanadium.

Other aspects, embodiments, and advantages of the process of the present invention are discussed in detail below. Moreover, it is to be understood that both the foregoing information and the following detailed description are merely illustrative examples of various aspects and embodiments, and are intended to provide an overview or framework for understanding the nature and character of the claimed features and embodiments. The accompanying drawing is included to provide illustration and a further understanding of the various aspects and embodiments. The drawing, together with the remainder of the specification, serves to explain principles and operations of the described and claimed aspects and embodiments.

BRIEF DESCRIPTION OF THE DRAWING

The foregoing summary, as well as the following detailed description will be best understood when read in conjunction with the attached drawing in which the FIGURE is a schematic diagram of a process for the gasification of solvent deasphalting process bottoms in accordance with the present invention.

DETAILED DESCRIPTION OF THE INVENTION

The process for the production of synthesis gas and/or hydrogen by the partial oxidation in a membrane wall gasification reactor of solvent deasphalting process bottoms consisting of a spent solid adsorbent material, asphalt and process reject materials recovered from a solvent deasphalting process will be described with reference to the FIGURE.

In general, the apparatus for gasification of solvent deasphalting process bottoms in accordance with the present invention includes a membrane wall gasification reactor in which a flowable slurry of the solvent deasphalting process bottoms are partially oxidized to produce hydrogen and carbon monoxide as a hot raw synthesis gas, and slag; a steam generating heat exchanger to cool the hot raw synthesis gas; and a turbine to produce electricity from the steam.

In accordance with one or more additional embodiments, a process and apparatus for gasification of solvent deasphalting process bottoms further includes a water-gas shift reaction vessel to convert the carbon monoxide in the syngas to hydrogen through the water-gas shift reaction represented by $CO+H_2O \rightarrow CO_2+H_2$, to thereby increase the volume of hydrogen in the shifted synthesis gas.

Referring to the attached FIGURE, a suitable solvent deasphalting process bottoms gasification apparatus 10 includes a membrane wall gasification reactor 30, a heat exchanger 40, a turbine 50 and, optionally, a water-gas shift reaction vessel 60. Note that while the embodiment of apparatus 10 described herein includes a water-gas shift reaction vessel to enhance the output of hydrogen by conversion of a portion of the synthesis gas, alternative embodiments similar to apparatus 10 can be practiced for the recovery of synthesis gas without the water-gas shift reaction vessel.

Membrane wall gasification reactor 30 includes an inlet 18 in fluid communication with a conduit 12 for receiving a flowable slurry of solvent deasphalting process bottoms, a conduit 14 for introducing a pressurized stream of oxygen or an oxygen-containing gas, and a conduit 16 for introducing steam. Membrane wall gasification reactor 30 also includes an outlet 22 for discharging the hot raw synthesis gas, an outlet 24 for discharging slag, and a second outlet 26 with a control valve 28 for controlled withdrawal of hot raw synthesis gas for use in other downstream processes.

Heat exchanger 40 includes an inlet 32 in fluid communication with outlet 22 of the membrane wall gasification reactor 30, an outlet 42 for discharging produced steam, and an outlet 46 for discharging cooled synthesis gas. Outlet 42 is in fluid communication with a three-way control valve 43 to withdraw steam via conduit 45 for use in other unit operations and/or to convey steam via conduit 44 to the turbine 50 to generate electricity. Outlet 46 is in fluid communication with three-way control valve 48 to withdraw cooled synthesis gas via conduit 52 and/or to convey cooled synthesis gas to the water-gas shift reaction vessel 60 via conduit 53.

Turbine 50 includes an inlet 44 in fluid communication with the three-way control valve 43 and an outlet 51 for discharging electricity. Water-gas shift reaction vessel 60 includes an inlet 56 in fluid communication with the three-way control valve 48 for receiving cooled synthesis gas and a conduit 54 for admitting steam, and an outlet 62 for discharging shifted synthesis gas product.

A flowable slurry of solvent deasphalting process bottoms are prepared from a solvent deasphalting process, such as one described in U.S. Pat. No. 7,566,394, by fluidizing with nitrogen gas when the solvent deasphalting process bottoms are dry, i.e., free of solvent and oil, or by diluting them with light or residual oils when the solvent deasphalting process bottoms are wet. The diluents and solvent deasphalting process bottoms can be mixed in a mixing vessel with a stirrer or a circulation system before they are fed to the gasification reactor. The slurry of solvent deasphalting process bottoms is introduced as a pressurized feedstock via conduit 12 with a predetermined amount of oxygen or an oxygen-containing gas via conduit 14 and steam via conduit 16 into inlet 18 of the membrane wall gasification reactor 30. The solvent deasphalting process bottoms are partially oxidized in the membrane wall gasification reactor 30 to produce hydrogen, carbon monoxide and slag. The slag material, which is the final waste product resulting from the formation of ash from the solid adsorbent material and its condensation on the water-cooled membrane walls of gasification reactor 30, are discharged via outlet 24 and recovered for final disposal or for further uses, depending upon its quality and characteristics.

For certain applications and refinery unit operations, the hot raw synthesis gas can be withdrawn via outlet 26 and control valve 28 as required for use in other downstream processes. As also shown in the drawing, hydrogen and carbon monoxide can be discharged from outlet 22 of the membrane wall gasification reactor 30 as hot raw synthesis gas and passed to inlet 32 of the heat exchanger 40 to cool the hot gas.

Cooled synthesis gas is discharged via outlet 46 and can be withdrawn via the three-way control valve 48 and conduit 52 for use in other downstream processes. Steam discharged from outlet 42 of the heat exchanger 40 can be withdrawn via the three-way control valve 43 and conduit 45 and/or passed to inlet 44 of turbine 50 to produce electricity that is transmitted via electrical conductor 51.

In certain embodiments, at least a portion of the cooled synthesis gas 53 and steam introduced via conduit 54 are conveyed to inlet 56 of the water-gas shift reaction vessel 60. Steam for the water-gas shift reaction can be provided by conduit 54 from the steam-generating heat exchanger 40. Carbon monoxide is converted to hydrogen in the presence of steam by the water-gas shift reaction represented by $CO+H_2O \rightarrow CO_2+H_2$. A mixture of hydrogen, carbon dioxide, unreacted carbon monoxide and other impurities is discharged via outlet 62 as shifted synthesis gas. The increase in hydrogen content in the shifted synthesis gas is a function of the operating temperature and catalyst(s) used in the water-gas shift process. High purity hydrogen gas is optionally recovered by pressure swing absorption, membrane or liquid absorption, e.g., as described in U.S. Pat. No. 6,740,226.

The feedstocks for the system and process described herein are solvent deasphalting bottoms recovered from a solvent deasphalting process, such as that described in U.S. Pat. No. 7,566,394. Feedstocks are comprised of spent solid adsorbent, asphalt and process reject materials.

For an entrained-flow gasification reactor, the feedstock can contain solid adsorbent material in the range of from 2% to 50% by weight, or from 2% to 20% in certain embodiments, and from 2% to 10% in other embodiments.

The solid adsorbent materials used in the solvent deasphalting process can include attapulgus clay, alumina, silica, activated carbon, spent zeolites, spent catalysts composed of alumina and silica alumina, and mixtures thereof. Solid adsorbent material is "spent" when more than 50% of its original pore volume has been blocked by deposited carbonaceous material. Spent solid adsorbent material can include adsorbed heavy polynuclear aromatic molecules, compounds containing sulfur, compounds containing nitrogen, and/or compounds containing metals and/or metals. The spent adsorbent can be in the form of pellets, spheres, extrudates and/or natural shapes. The spent adsorbent can be dimensioned in the range of from 4 mesh to 60 mesh, has a surface area in the range of from 10 m$^2$/g to 1000 m$^2$/g. Furthermore, the spent adsorbent can have an average pore size in the range of from 10 angstroms (0.001 micron) to 5000 angstroms (0.5 micron), and a pore volume in the range of 0.1 cc/g to 0.5 cc/g. In certain embodiment, spent solid adsorbent material is attapulgus clay and has an average pore size in the range of from 10 angstroms to 750 angstroms. In a further embodiment, spent solid adsorbent material is activated carbon and has an average pore size in the range of from 5 angstroms to 400 angstroms.

Asphalt may be derived from naturally occurring hydrocarbons such as crude oil, bitumen, heavy oil, shale oil and refinery streams like atmospheric and vacuum residues, fluid catalytic cracking slurry oil, coker bottoms, visbreaking bottoms, or coal liquefaction products. Asphalt is soluble in solvents having a Hildebrants solubility parameter of 8.5 and higher, which includes all aromatic solvents such as benzene, toluene, xylenes, etc. Asphalt is hydrogen deficient, i.e., it contains at least 2 W % absolute less hydrogen than the original feedstock from which it was derived, and rich in contaminants, i.e., it typically contains at least 40% more sulfur and at least 100% more nitrogen than the original feedstock from which it was derived.

Process reject materials include heavy hydrocarbon molecules containing sulfur, nitrogen and/or heavy aromatic molecules.

In general, the operating conditions for the membrane wall gasification reactor include: a temperature in the range of from 900° C. to 1700° C., in certain embodiments 950° C. to 1600° C., and in further embodiments 1000° C. to 1500° C.; a pressure in the range of from 1 bar to 100 bars, in certain embodiments 10 bars to 75 bars, and in further embodiments 20 bars to 50 bars; a molar ratio of oxygen-to-carbon content of the feedstock in the range of from 0.3:1 to 10:1, in certain embodiments 0.4:1 to 5:1, and in further embodiments 1:1 to 3:1; a molar ratio of steam-to-carbon content of the feedstock in the range of from 0.1:1 to 10:1, in certain embodiments 0.1:1 to 2:1, and in further embodiments 0.4:1 to 0.6:1.

The properties of the synthesis gas subjected to the water-gas shift reaction include a temperature in the range of from 150° C. to 400° C.; a pressure in the range of from 1 bar to 60 bars; and a mole ratio of water-to-carbon monoxide in the range of from 5:1 to 3:1.

Distinct advantages are offered by the apparatus and processes described herein when compared to other disposal methods for solvent deasphalting process bottoms. Valuable synthesis gas and/or hydrogen gas, process steam and/or electricity can be efficiently produced for on-site refinery use. It is particular advantageous when hydrogen is needed for hydroprocessing and natural gas is not available. This is usually the case in refineries when full conversion is required to meet the demand for cleaner and lighter products, such as gasoline, jet fuel, and diesel transportation fuels. In addition, the apparatus and processes described herein minimize the solvent deasphalting equipment because full or partial asphaltenes and solid mixtures are sent to the gasification reactor without going through the adsorbent regeneration process.

EXAMPLE

A flowable slurry of 1000 kg of solvent deasphalting process bottoms containing asphaltenes and spent adsorbent materials is introduced as a pressurized feedstock into a membrane wall gasification reactor. Table 1 includes the elemental composition of the solvent deasphalting process bottoms feedstock.

TABLE 1

| Component | W % |
|---|---|
| C | 81.51 |
| H | 8.11 |
| S | 7.04 |

TABLE 1-continued

| Component | W % |
|---|---|
| N | 0.82 |
| O | 0.52 |
| Ash | 2.00 |
| Molecular weight, Kg/Kg-mol | 800 |

The gasification reactor is operated at 1045° C. and 30 bars. The ratio of steam-to-carbon is 0.6:1 by weight. The ratio of oxygen-to-carbon is 1:1 by weight. Solvent deasphalting process bottoms are partially oxidized to produce hydrogen, carbon monoxide and slag. Hydrogen and carbon monoxide are recovered as hot raw synthesis gas and sent to a water-gas shift reaction vessel to increase the hydrogen yield. The water-gas shift reaction is conducted at 318° C. and 1 bar. The mole ratio of steam-to-carbon monoxide is 3:1.

The product yields are summarized in Table 2 from which it can be seen that about 205 kg of hydrogen gas is produced from 1000 kg of solvent deasphalting process bottoms following the water-gas shift reaction.

TABLE 2

| Composition | Solvent Deasphalting Process Bottoms Feedstock (via conduit 12) Kg | Oxygen (via conduit 14) Kg | Steam (via conduit 16) Kg | Raw Synthesis Gas (via outlet 22 and inlet 56) Kg | Steam (via conduit 54) Kg | Shifted Synthesis Gas (via outlet 62) Kg |
|---|---|---|---|---|---|---|
| Heavy Residual Oil Feedstock | 1000.0 | | | | | |
| Hydrocarbon Content of Feedstock (excluding ash, sulfur and other contaminants) | 896.2 | | | | | |
| Oxygen | | 1000.0 | | | | |
| $H_2/CO$ | | | | | | |
| $CH_4$ | | | | 2.6 | | 2.6 |
| $H_2$ | | | | 96.1 | | 205.4 |
| CO | | | | 1588.9 | | 69.4 |
| $CO_2$ | | | | 330.5 | | 2718.3 |
| $H_2O$ | | | 489.0 | 163.3 | 1352.1 | 538.6 |
| $H_2S$ | | | | 67.3 | | 67.3 |
| COS | | | | 13.2 | | 13.2 |
| $N_2$ | | | | 14.8 | | 14.8 |
| Ar | | | | 0.0 | | 0.0 |
| $NH_3$ | | | | 0.8 | | 0.8 |
| Total | 1000.0 | 1000.0 | 489.0 | 2277.5 | 1352.1 | 3630.4 |
| Material Balance Total | | | | 91.5 | | |
| Material Balance Oxygen | | | | 90.4 | | |

The method and system of the present invention have been described above and in the attached drawing; however, modifications will be apparent to those of ordinary skill in the art from this description and the scope of protection for the invention is to be determined by the claims that follow.

The invention claimed is:

1. A process for the gasification of solvent deasphalting process bottoms containing a spent solid adsorbent material recovered from a solvent deasphalting process to produce synthesis gas, the bottoms containing ash-forming constitutes, the process comprising:
   a. preparing a flowable slurry of the solvent deasphalting process bottoms consisting of the spent solid adsorbent material, asphalt and process reject materials;
   b. introducing the slurry of solvent deasphalting process bottoms as a pressurized feedstock into a membrane wall gasification reactor with a predetermined amount of oxygen and steam based on the carbon content of the feedstock;
   c. operating the gasification reactor at a temperature in the range of 900° C. to 1700° C. and a pressure of from 20 bars to 100 bars;
   d. subjecting the solvent deasphalting process bottoms to partial oxidation to produce hydrogen, carbon monoxide and slag derived from the spent solid adsorbent material;
   e. recovering the hydrogen and carbon monoxide from the reactor in the form of a hot raw synthesis gas;
   f. passing the hot raw synthesis gas to a steam generating heat exchanger to cool the hot raw synthesis gas and produce steam;
   g. recovering steam from the heat exchanger and introducing the steam into a turbine to produce electricity; and
   h. recovering the cooled synthesis gas.

2. The process of claim 1 in which the solid adsorbent material has at least 50% of its original pore volume blocked by deposited carbonaceous material.

3. The process of claim 1 in which the solid adsorbent material is selected from the group consisting of attapulgus clay, alumina, silica, activated carbon, spent zeolites, spent catalysts composed of alumina and silica alumina, and mixtures thereof.

4. The process of claim 1 in which the solid adsorbent material includes adsorbed heavy polynuclear aromatic molecules, compounds containing sulfur, compounds containing nitrogen, compounds containing metals and/or metals.

5. The process of claim 1 in which the solid adsorbent material is in the form of pellets, spheres, extrudates and/or natural shapes.

6. The process of claim 1 in which the particle size of solid adsorbent material is in the range of from 4 mesh to 60 mesh.

7. The process of claim 1 in which the solid adsorbent material has a surface area in the range of from 10 $m^2/g$ to 1000 $m^2/g$.

8. The process of claim 1 in which the solid adsorbent material has a pore size in the range of from 10 angstroms (0.001 micron) to 5000 angstroms (0.5 micron).

9. The process of claim 1 in which the solid adsorbent material has a pore volume in the range of from 0.1 cc/g to 0.5 cc/g.

10. The process of claim 1, wherein the solvent deasphalting process bottoms comprise in the range of from 2% to 50% by weight of solid adsorbent material.

11. The process of claim 1, wherein the solvent deasphalting process bottoms comprise in the range of from 2% to 20% by weight of solid adsorbent material.

12. The process of claim 1, wherein the solvent deasphalting process bottoms comprise in the range of from 2% to 10% by weight of solid adsorbent material.

13. The process of claim 1, wherein the solvent deasphalting process bottoms comprise spent solid adsorbent material in the range of from 0.5% to about 50% by volume.

14. The process of claim 1, wherein the solvent deasphalting process bottoms comprise spent solid adsorbent material in the range of from 2% to 10% by volume.

15. The process of claim 1, wherein the asphalt is derived from naturally occurring hydrocarbons comprising crude oil, bitumen, heavy oil, shale oil, atmospheric and vacuum residues, fluid catalytic cracking slurry oil, coking unit fractionator bottoms, visbreaking process bottoms, or coal liquefaction products.

16. The process of claim 1 in which the asphalt is separated from a hydrocarbon feedstock containing asphaltenes with a paraffinic solvent having from 3 to 8 carbon atoms.

17. The process of claim 1, wherein the process reject materials comprise heavy hydrocarbon molecules containing sulfur, nitrogen and/or heavy aromatic molecules.

18. The process of claim 1, wherein the flowable slurry of solvent deasphalting process bottoms includes a viscosity-adjusting hydrocarbon solvent.

19. The process of claim 1, wherein the flowable slurry of solvent deasphalting process bottoms are dry and includes fluidizing nitrogen gas.

20. The process of claim 1, wherein the ratio of oxygen-to-carbon in the gasification reactor is in the range of from 0.3:1 to 10:1 by weight.

21. The process of claim 1, wherein the ratio of steam-to-carbon in the gasification reactor is in the range of from 0.1:1 to 10:1 by weight.

22. The process of claim 1, further comprising subjecting the cooled synthesis gas from step (f) to a water-gas shift reaction with a predetermined amount of steam, and recovering a stream comprising hydrogen and carbon dioxide.

23. The process of claim 22, wherein the temperature of the synthesis gas subjected to the water-gas shift reaction is in the range of from 150° C. to 400° C.

24. The process of claim 22, wherein the pressure of the synthesis gas subjected to the water-gas shift reaction is in the range of from 1 bar to 60 bars.

25. The process of claim 24, wherein the mole ratio of water-to-carbon monoxide in the water-gas shift reaction vessel is in the range of from 5:1 to 3:1.

\* \* \* \* \*